(12) United States Patent
Hayashi et al.

(10) Patent No.: US 6,415,106 B2
(45) Date of Patent: Jul. 2, 2002

(54) PORTABLE APPARATUS

(75) Inventors: Naohiko Hayashi, Sakai; Yoshiyuki Inoue, Izumi; Daigo Yoshioka, Toyonaka; Shoichi Minato, Sakai, all of (JP)

(73) Assignee: Minolta Co., Ltd., Osaka (JP)

( * ) Notice: Subject to any disclaimer, the term of this patent is extended or adjusted under 35 U.S.C. 154(b) by 19 days.

(21) Appl. No.: 09/741,155

(22) Filed: Dec. 21, 2000

(30) Foreign Application Priority Data

Dec. 22, 1999 (JP) .......................................... 11-364351

(51) Int. Cl.⁷ .............................................. G03B 17/00
(52) U.S. Cl. .......................... 396/85; 396/299; 348/376; 358/909.1
(58) Field of Search .............................. 396/85, 86, 87, 396/297, 298, 299, 543; 348/207, 376; 358/906, 909.1

(56) References Cited

U.S. PATENT DOCUMENTS

| | | | |
|---|---|---|---|
| 4,857,951 A | * 8/1989 | Nakajima et al. | 396/90 |
| 5,128,704 A | * 7/1992 | Hayashi et al. | 396/299 |
| 5,291,236 A | * 3/1994 | Ohsawa et al. | 396/297 |
| 5,943,625 A | 8/1999 | Yeom et al. | |
| 6,067,358 A | 5/2000 | Grant | |
| 6,102,585 A | 8/2000 | Kataoka et al. | |
| 6,118,480 A | 9/2000 | Anderson | |

* cited by examiner

*Primary Examiner*—David M. Gray
(74) *Attorney, Agent, or Firm*—McDermott, Will & Emery

(57) ABSTRACT

A portable apparatus having setting means for setting mutually contradictory functions, wherein the setting means comprises a pair of operation buttons, and the operation buttons are disposed on opposing surfaces of the body of the portable apparatus, respectively.

9 Claims, 5 Drawing Sheets

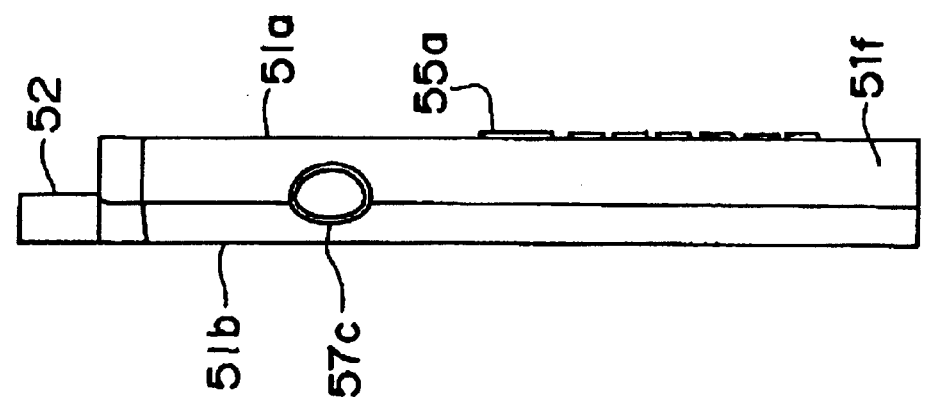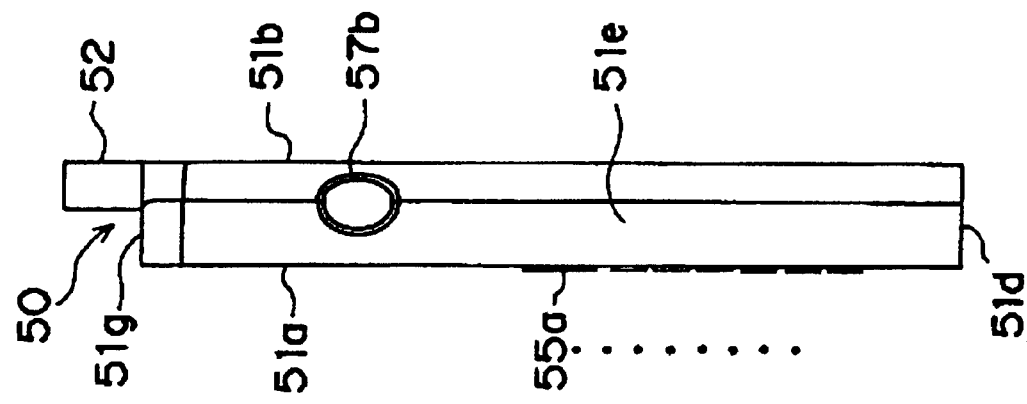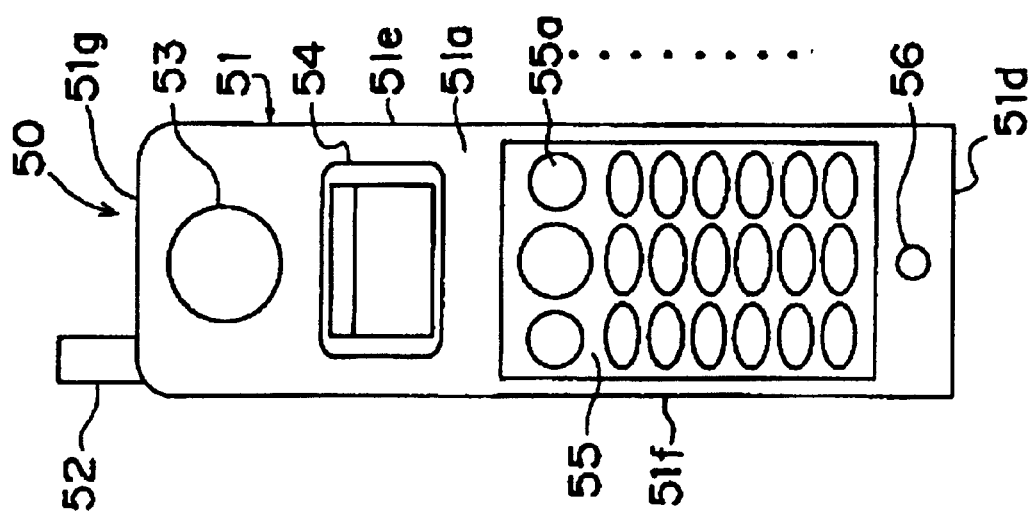

PORTABLE APPARATUS

This application is based on application No. Hei 11-364351 field in Japan, the content of which is hereby incorporated by reference.

FIELD OF THE INVENTION

The present invention relates to a portable apparatus, i.e. a camera, a portable telephone, a personal digital assistant (PDA), etc. Particularly, the present invention relates to a portable apparatus in which the operability of a pair of operation buttons for setting mutually contradictory functions (opposite functions) has been improved.

DESCRIPTION OF THE RELATED ART

Portable apparatuses such as cameras, portable telephones and computers have been reduced in size and weight to improve portability. To miniaturize portable apparatuses, it is necessary to miniaturize parts and members used therefor as well as to miniaturize the body. While parts and members for portable apparatuses have been not only miniaturized but also technically examined and variously improved, miniaturized operation buttons tend to be difficult to operate.

Portable apparatuses have various operation buttons for performing various functions. For substantially box-shaped portable apparatuses, there are cases (1) where all the operation buttons are disposed on one surface and (2) where mainly associated operation buttons are disposed on one surface and operation buttons not closely associated are disposed on other surfaces. In the former case, miniaturization of portable apparatuses decreases the areas occupied by the operation buttons, so that the operability of the buttons deteriorates. In the latter case, the operability of the operation buttons deteriorates although the deterioration is not as much as that in the former case. In either case, the deterioration of the operability due to miniaturization is pronounced for a pair of operation buttons for setting mutually contradictory functions (for example, operation buttons for performing various settings such as a function of moving an operation portion back and forth and rotating the operation portion left and right, a function of turning the volume up and down, a function of increasing and decreasing the illumination of the displayed part and a function of scrolling the displayed part back and forth and left and right).

For example, in the case of a camera, buttons such as zoom buttons for driving the zoom mechanism to the telephoto side and the wide-angle side or exposure correction buttons for correcting exposure to the (+) side and the (−) side are provided as the operation buttons. Such a pair of operation buttons for setting mutually contradictory functions include a type in which the operation buttons are disposed on one surface so as to be adjacent to each other and the setting is changed by operating one of the buttons. There is also a type having rotary switches or cross-shaped keys instead of operation buttons. In any case, when these are reduced in size, the operation section is too small for the sizes of the user's fingers, so that it is difficult to quickly perform the above-mentioned setting changing operation and the operability is inferior. Particularly, when a pair of operation buttons of which functions are mutually contradictory are disposed on one operation surface so as to be adjacent to each other, it is highly likely that the user misoperates the buttons, and when this happens, the operation diametrically opposite to the operation that the user intends to perform is performed.

As described above, for conventional portable apparatuses, attention tends to be paid only to size reduction and sufficient consideration is not given to the operability of the operation buttons.

SUMMARY OF THE INVENTION

An object of the present invention is to improve the operability of setting means in a portable apparatus having setting means such as a pair of operation buttons for setting mutually contradictory functions.

To solve the above-mentioned object, according to the present invention, a portable apparatus of the following structure is provided:

In a portable apparatus having setting means for setting mutually contradictory functions, the setting means comprises a pair of operation buttons, and the operation buttons are disposed on opposing surfaces of the body of the portable apparatus, respectively.

According to this structure, since the user can set mutually contradictory functions by operating a pair of operation buttons disposed on opposing surfaces of the portable apparatus with two fingers while holding the body of the portable apparatus, operation errors are reduced. Moreover, since the setting operation can be grasped by a sensation on the tips of two fingers, the user can be sure that the operation has been performed without any errors.

By disposing one operation button on a surface and the other operation button on the opposed surface, the area occupied by one operation button can be larger than in a case where a pair of operation buttons are disposed on one surface, so that the operability improves.

It is desirable that the operation buttons be disposed in positions corresponding to the thumb and the forefinger or the middle finger when the portable apparatus is held.

According to this structure, the user can independently operate a pair of operation buttons disposed on opposing surfaces of the portable apparatus with the thumb and the forefinger or the middle finger of one hand while holding the body of the portable apparatus between the thumb and the forefinger of the hand. That is, the user can simultaneously perform the holding of the body of the portable apparatus and the operation of the buttons with one hand, and can perform another work with the other hand which is free.

Preferably, the portable apparatus is a camera having a zoom mechanism, and the pair of operation buttons are operated to drive the zoom mechanism to the telephoto side and the wide-angle side.

Preferably, the portable apparatus is a camera having an exposure correction mechanism, and the pair of operation buttons are operated to correct the exposure amount to the (+) side and the (−) side.

Preferably, the portable apparatus is a digital camera having image display means for displaying a shot image, and the pair of operation buttons are operated to increase and decrease the frame number of the shot image.

Preferably, the pair of operation buttons are disposed on the subject side surface and the user side surface of the camera, respectively.

According to this structure, the user can hold the camera and operate the pair of buttons in a natural position called the ordinary grip. Consequently, the user hardly becomes fatigued even if he or she holds the camera for a long time, and the possibility of camera shake occurring at the time of shooting is small.

Preferably, the pair of operation buttons are disposed on surfaces opposing in a direction perpendicular to the optical axis of shooting light of the camera.

According to this structure, since the user's hands do not intervene between the back surface of the camera and the user's face, the user's face can be close to the back surface of the camera, so that the user can also perform shooting while viewing through the finder. Moreover, it never happens that the user's hand inadvertently obstructs members exposed at the front surface of the camera such as the lens section, the distance measurement section, the photometric measurement section and the flash. Since optical members occupying comparatively large areas such as the lens section, the finder and the flash are not provided on the surfaces opposing in directions perpendicular to the optical axis of shooting light of the camera, the operation buttons can be increased in size and the degree of freedom of disposition of the operation buttons increases.

Preferably, setting means switching means capable of reversing the setting of mutually contradictory functions is provided.

According to this structure, when the user cannot be familiar with the preset operation method of the setting means, the setting can be reversed by the setting means switching means so that the user can perform the operation easier.

Moreover, the present invention provides a portable apparatus of the following structure:

In a portable apparatus having setting means for setting mutually contradictory functions, the setting means comprises a pair of operation buttons and the operation buttons are disposed on different surfaces of the body of the portable apparatus, respectively.

According to this structure, since the user independently operates a pair of operation buttons for setting mutually contradictory functions with two fingers, operation errors are reduced. By disposing one operation button on a surface and the other operation button on the opposing surface, the area occupied by one operation button can be increased, so that the operability improves. In addition, the degree of freedom of disposition of the operation buttons is very high.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

FIGS. 7A, 7B and 7C are a front view, a right side view and a left side view of a portable telephone according to a third embodiment of the present invention, respectively.

DESCRIPTION OF THE PREFERRED EMBODIMENTS

Figure 1:
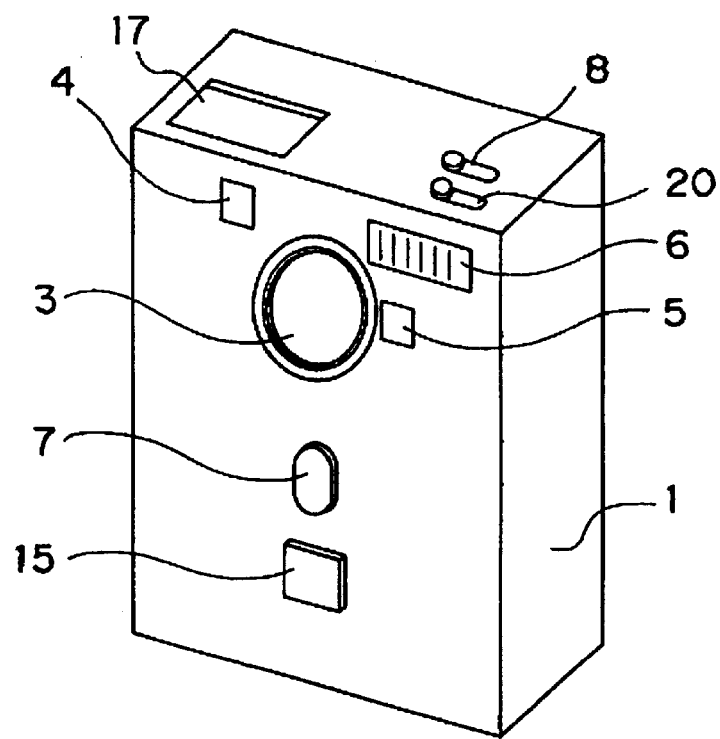
FIG. 1 is a perspective view of a digital camera according to a first embodiment of the present invention viewed from the front.
Figure 2:
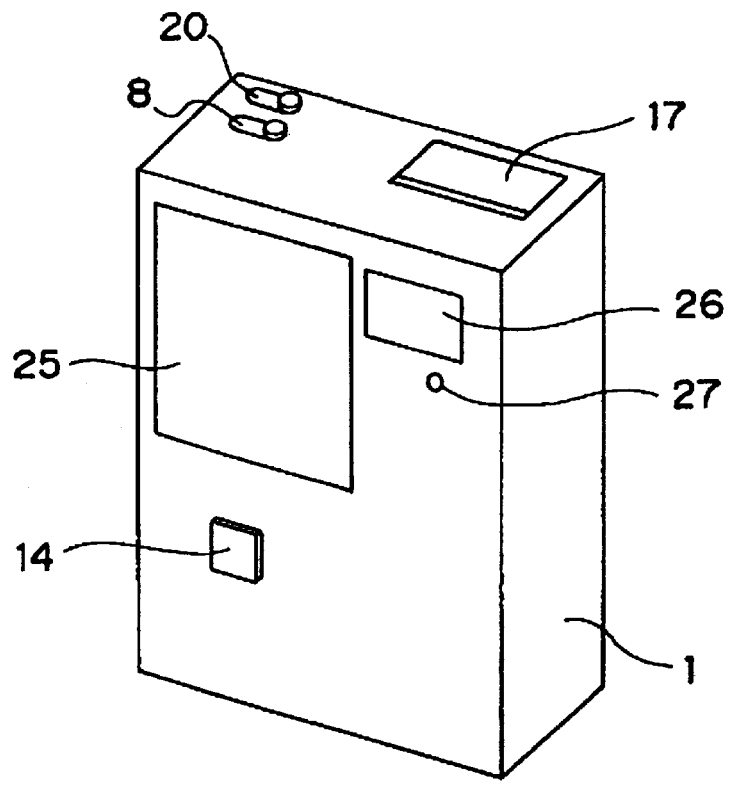
FIG. 2 is a perspective view of the digital camera of FIG. 1 viewed from the back.

FIGS. 1 to 4B show a digital camera according to a first embodiment of the present invention. FIGS. 1 and 2 are perspective views of the digital camera viewed from the front and the back, respectively.

This camera has a comparatively thin camera body 1 having a hexahedral box shape which is substantially rectangular when viewed from the front. On the front surface thereof, the following are provided: a lens 3; a release button 7; an autofocus unit 5; a finder window 4; a flash 6; and an operation button 15 as setting means for setting the focal length to the telephoto side. The lens 3 is disposed in a center in an upper part on the front surface of the camera body 1. Below the lens 3, the release button 7 which is substantially elliptical is disposed at a distance such that the lens 3 is not touched by or covered with the user's hand. The operation button 15 which is square is disposed below the release button 7 at a distance such that operation of the release button 7 is not obstructed by the operation button 15.

The shapes of the release button 7 and the operation button 15 are not limited to the ones shown in FIG. 1, but these buttons may have various other shapes such as a circle, a triangle, a rectangle and a star shape, or a concave or a convex portion may be provided on the surface of the buttons. By providing these buttons with different shapes or performing different uneven surface processings thereon, the user can easily distinguish between the release button 7 and the telephoto-side operation button 15 by feeling the difference in shape with a fingertip.

In FIG. 2, in an upper part on the back surface of the camera body 1, an image display section 25, a finder 26 and a focus indicator 27 are provided. In a position below these members and substantially opposed to the operation button 15, an operation button 14 as setting means for setting the focal length to the wide-angle side is provided. That is, the pair of operation buttons 14 and 15 are disposed in positions corresponding to the thumb and the forefinger or the middle finger when the camera is held, respectively. These buttons constitute setting means for setting mutually contradictory functions (opposite functions) of driving the zoom mechanism to the wide-angle side and to the telephoto side. The operation buttons 14 and 15 function also as access buttons for calling up recorded images at the time of image reproduction. When the operation button 14 or 15 being functioning as a recorded image access button is depressed, recorded images are shifted in the forward direction (UP) or the reverse direction (DOWN).

While the operation button 14 shown in FIG. 2 has a square shape substantially the same as the shape of the operation button 15, the operation buttons 14 and 15 may have different shapes. The positions of the operation buttons 14 and 15 may be reversed.

The areas occupied by the operation buttons 14 and 15 shown in FIGS. 1 and 2 can be larger than those in a case where these buttons are disposed on one surface. The positions of the operation buttons 14 and 15 are not limited to those shown in FIGS. 1 and 2. Preferred positions of the pair of operation buttons are positions where the operation buttons can be ergonomically easily operated when the camera 1 is held, that is, positions where the operation buttons can be depressed with the thumb and the forefinger or the middle finger of the hand holding the camera body 1 or the hand not holding the camera body 1.

As shown in FIG. 1 or 2, on the top surface of the camera body 1, an information display section 17, a mode selection switch 8 and a (+) and (−) direction changing switch 20 are provided. The information display section 17 comprises, for example, an liquid crystal display (LCD), and displays thereon shooting modes, the frame number at the time of shooting, shooting data or the date and time. The mode selection switch 8 having three click positions switches between "ON" and "OFF" of the power and selects a "recording" mode or a "reproduction" mode. The (+) and (−) direction changing switch 20 is means for changing the function of the setting means, and interchanges the functions of the operation buttons 14 and 15 so as to be reversed.

Figure 3:
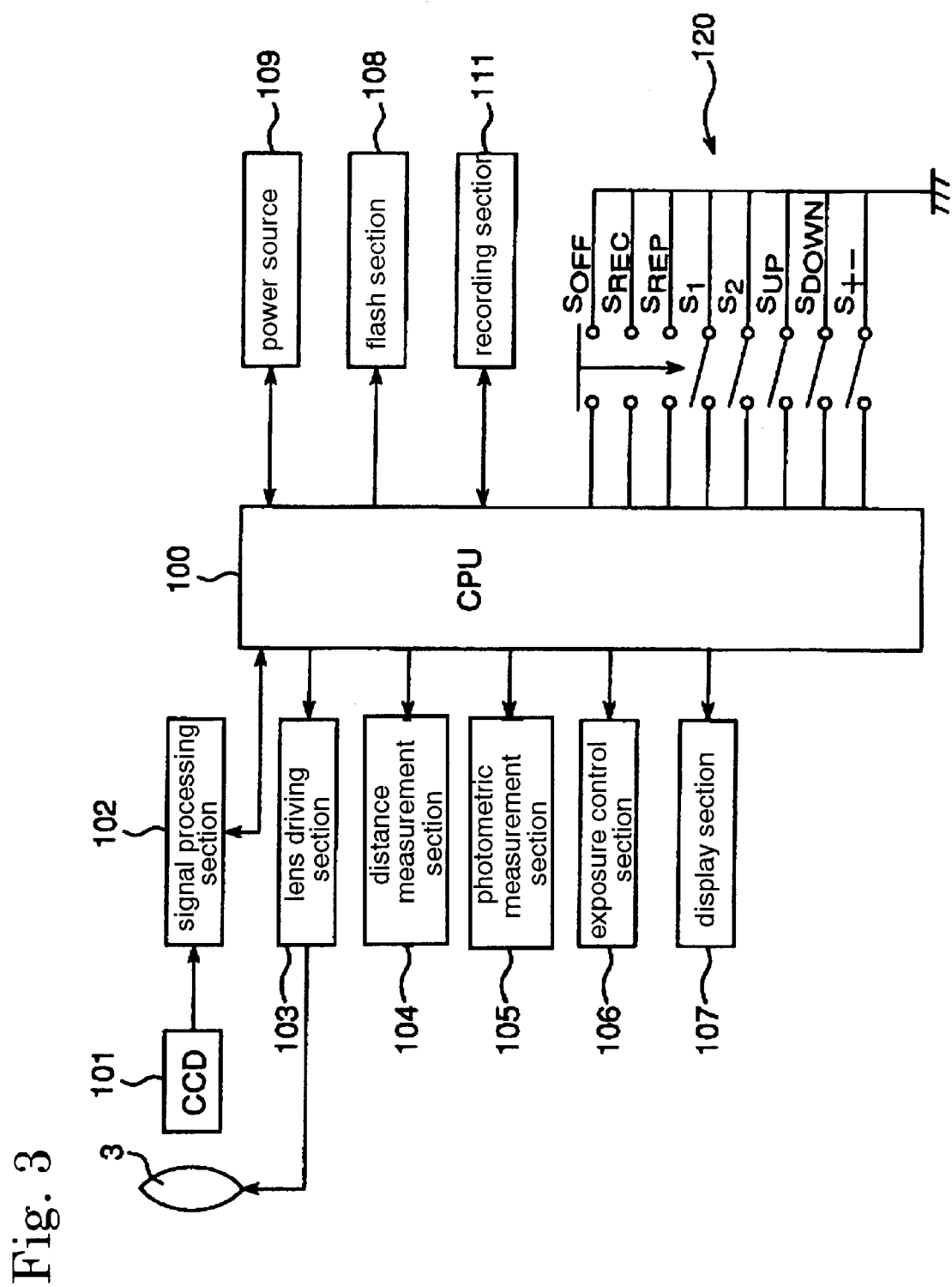
FIG. 3 is a block circuit diagram of the digital camera of FIGS. 1 and 2.

FIG. 3 is a block circuit diagram of the digital camera of FIGS. 1 and 2.

A system controller (hereinafter, referred to as CPU) 100 controls operations of the entire camera. Subject images formed through the lens 3 are captured by a solid-state image sensing device (hereinafter, referred to as CCD 101), and the image signals output from the CCD 101 are processed by a signal processing section 102. The lens 3 is driven so as to be in-focus state by a lens driving section 103 based on the distance measurement result. A distance measurement section 104 obtains the distance to a subject, for example, by the phase difference detection method. The amount of driving of the lens 3 by the lens driving section 103 is calculated from the distance measurement data. The lens driving section 103 drives the protrusion and collapse of the lens barrier holding the lens 3 and the opening and closing of the lens barrier. A photometric measurement section 105 measures the brightness of the subject, and outputs the photometric measurement data to the CPU 100. An exposure control section 106 performs exposure control of the camera in accordance with the exposure time (shutter speed) and the aperture value calculated by the CPU 100 based on the data obtained through the distance measurement and the photometric measurement. A display section 107 comprises the information display section 17, the image display section 25 and a driver for driving them. A flash section 108 causes the flash 6 to emit light by being controlled by a charging voltage increase signal or a light emission control signal from the CPU 100. A power source section 109 applies a predetermined high voltage to the flash section 108 and applies a voltage of a predetermined level to other circuit sections. A recording section 111 is for recording the image data captured by the CCD 101 through shooting which image data has been processed into a predetermined format by the signal processing section 102. Various types of recording devices such as a semiconductor memory and a small-size hard disk may be used as the recording section 111.

In the camera body 1 is provided the CPU 100, the CCD 101, the signal processing section 102, the lens driving section 103, the distance measurement section 104, the photometric measurement section 105, the exposure control section 106, the power source 109, the flash section 108 and the recording section 111. The CPU 100 is electrically connected to these members to control the signals input and output between the members, thereby controlling operations of the entire camera.

Next, switches 120 comprising $S_{OFF}$, $S_{REC}$, $S_{REP}$, $S_1$, $S_2$, $S_{UP}$, $S_{DOWN}$ and $S_{(+)(-)}$ connected to the CPU 100 will be described.

$S_{OFF}$ is a switch for turning "OFF" the power. When the mode selection switch 8 is set in an "OFF" position, the power is turned "OFF", so that the camera is deactivated.

$S_{REC}$ is a switch for the "recording" mode. When the mode selection switch 8 is set in a "recording" position, the switch is turned "ON". In the "recording" mode, shooting with the camera is enabled, and the images are recorded in the recording section 111.

$S_{REP}$ is a switch for the "reproduction" mode. When the mode selection switch 8 is set in a "reproduction" position, the switch is turned "ON". In the "reproduction" mode, images recorded in the recording section 111 can be displayed on the image display section 25 and image data can be transferred to a personal computer or the like connected to the camera.

$S_1$ is a switch for the shooting preparations, and corresponds, for example, to the first-stroke depression (half depression) of the release button 7. When the user first-stroke-depresses the release button 7, the switch is turned "ON" to instruct the CPU 100 to start the shooting preparations.

$S_2$ is a switch for the shooting operation, and corresponds, for example, to the second-stroke depression (full depression) of the release button 7. When the user second-stroke-depresses the release button 7, the switch is turned "ON" to instruct the CPU 100 to start the shooting operation.

$S_{UP}$ is a switch corresponding to the operation button 14. The set value is incremented every time the operation button 14 is depressed, whereby, for example, the zoom mechanism is driven to the telephoto side.

$S_{DOWN}$ is a switch corresponding to the operation button 15. The set value is decremented every time the operation button 15 is depressed, whereby, for example, the zoom mechanism is driven to the wide-angle side.

$S_{(+)(-)}$ has two positions, a first position and a second position, and reverses the setting functions by the SUP and SDOWN buttons when moved from the first position to the second position.

Next, a method of operating the digital camera according to the first embodiment will be described with reference to FIGS. 4A and 4B.

Figure 4A:
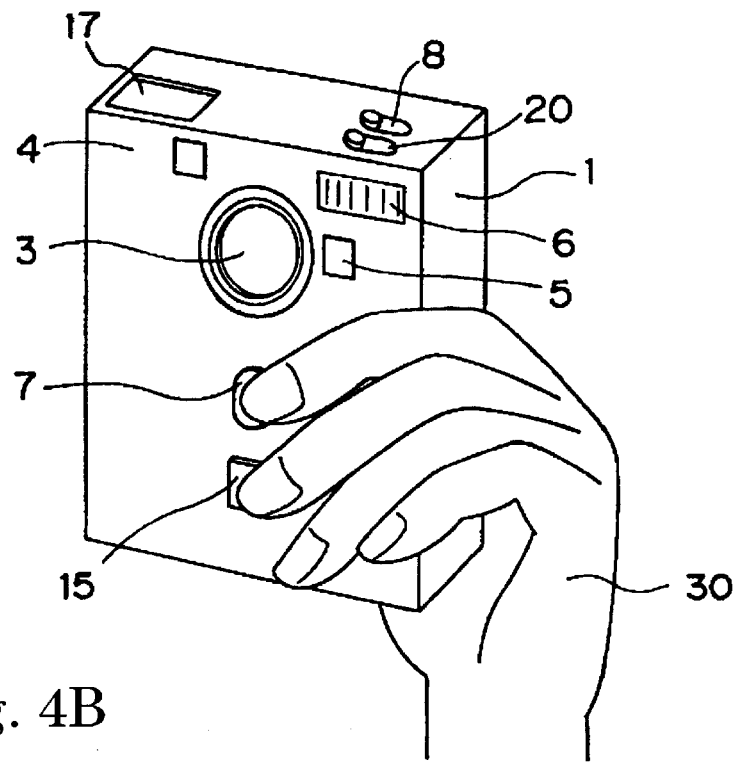
FIGS. 4A and 4B are perspective views showing an operation condition of the digital camera of FIG. 1 viewed from the front and from the back, respectively.
Figure 4B:
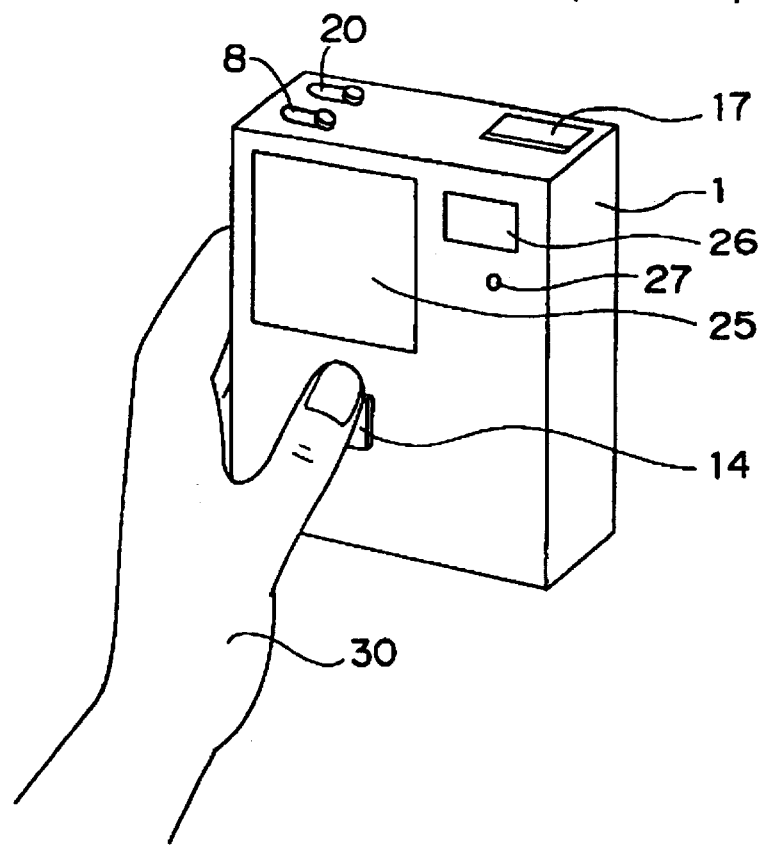

FIGS. 4A and 4B are perspective views showing an operation condition of the digital camera of FIG. 1 viewed from the front and the back, respectively.

First, the method of operation in the recording mode will be described.

When the user moves the mode selection switch 8 from the "OFF" position to the "recording" position, power is supplied to the sections. Then, the CPU 100 checks whether the sections are operating normally or not. When a malfunction is found, the user is notified of it by warning means using sound or light. When there is no malfunction, the user sandwiches the thin camera body 1 between the thumb and the forefinger of his or her left hand to hold the camera body 1 in a natural position called the ordinary grip. Consequently, the user hardly becomes fatigued even if he or she holds the camera body 1 for a long time, and the possibility of camera shake occurring at the time of shooting is small. This operation position enables the user to perform another work with his or her right hand which is free, because the camera body 1 is held only with the left hand. The release button 7 and the operation button 15 on the front surface of the camera and the operation button 14 on the back surface of the camera can be depressed with the forefinger, the middle finger and the thumb of the user's left hand, respectively. It is also possible to operate the release button 7 with the forefinger of the right hand while operating the operation buttons 15 and 14 with the thumb and the forefinger of the left hand. A "right hand" operation and a "left hand" operation described above and described later may be reversed.

To decide the composition of the subject, the user zooms in and out on the subject by alternately depressing the operation button 15 and the operation button 14 with the middle finger and the thumb, respectively, while viewing through the finder 26 or viewing the image displayed on the image display section 25. At this time, since the operation buttons 14 and 15 are disposed on different surfaces and the areas occupied thereby are large, the user can operate the large-area operation buttons 14 and 15 with ease, so that operation errors are reduced. When determining that a desired composition is obtained, the user lightly depresses (half depresses) the release button 7. Then, the shooting preparations (photometric measurement, distance measurement, exposure calculation, driving of the lens 3, etc.) are performed. When the user further depresses (fully depresses) the release button 7, shooting is actually performed, and the shot image is recorded into the recording section 111. When there is worry that camera shake occurs at the time of shooting, the free hand may be added to hold the camera.

By switching the function of the operation buttons 14 and 15 from the function of driving the zoom mechanism to the telephoto side and the wide-angle side to a function of increasing and decreasing the exposure amount of the exposure correction mechanism, the exposure amount of the exposure correction mechanism can be corrected to the (+) side and the (−) side.

Next, the method of operation in the reproduction mode will be described.

When the mode selection switch 8 is set in the "reproduction" position, shot images recorded in the recording section 111 are called up and displayed on the image display section 25. At this time, the operation buttons 14 and 15 function as access buttons for calling up recorded image data. When the user depresses the operation button 14 or 15, recorded images are shifted in the forward direction (UP) or the reverse direction (DOWN), that is, shifted frame by frame on the image display section 25. The user selects an image which he or she wants to view from among the scrolled displayed images. By using the operation buttons 14 and 15 also as the image data access buttons as described above, the total number of buttons can be reduced.

Next, a digital camera according to a second embodiment will be described with reference to FIGS. 5 and 6.

Figure 5:
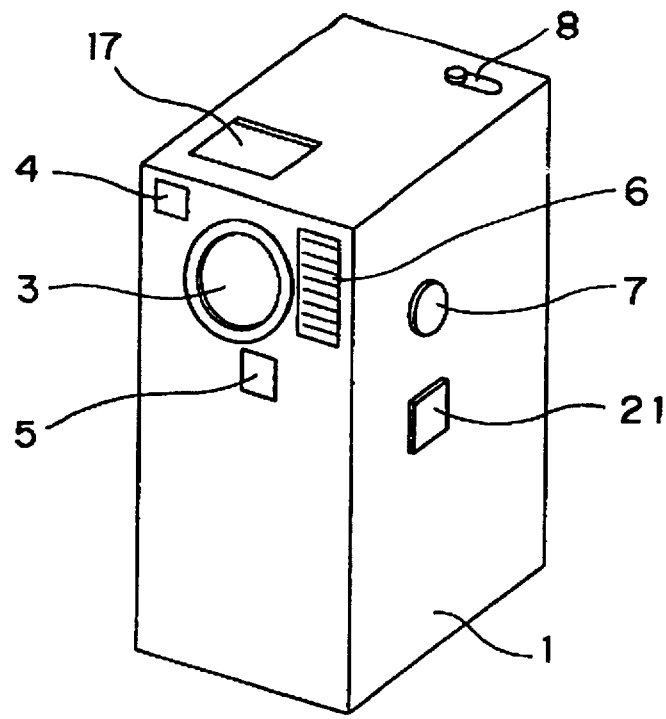
FIG. 5 is a perspective view of a digital camera according to a second embodiment of the present invention viewed from the front.
Figure 6:
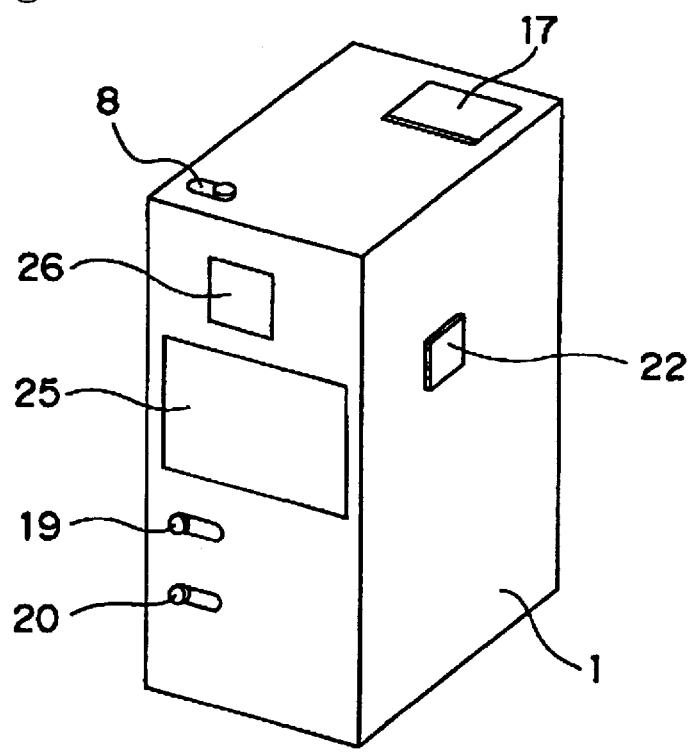
FIG. 6 is a perspective view of the digital camera of FIG. 5 viewed from the back.

FIGS. 5 and 6 are front and rear perspective views of the digital camera, respectively. While the digital camera of this embodiment has almost the same configuration as the digital camera of the first embodiment, it is different from the digital camera of the first embodiment in the shape of the camera body 1 and the positions of the members as shown in FIGS. 5 and 6. That is, when the surface where the lens 3 is provided is the front surface, the camera body 1 has a box shape with a depth and a narrow width when viewed from the front. In FIG. 6, the release button 7 and a (+) direction operation button 21 are disposed on the left side surface of the body, and a (−) direction operation button 22 is disposed on the right side surface of the body. A function changing switch 19 for changing the function of the pair of mutually contradictory (+) direction and (−) direction operation buttons 21 and 22 to another function (for example, the function of increasing and decreasing the exposure amount of the exposure correction mechanism or a function of adjusting the brightness and the contrast of the image display section 25) is provided on the back surface of the camera body 1.

When the buttons are disposed as shown in FIGS. 5 and 6, for example, the camera body 1 is held from below with only the right hand so as to be sandwiched between the thumb and the forefinger of the right hand in the direction of width of the camera body 1, so that another work can be performed with the left hand which is free. In this button disposition, the thumb abuts on the operation button 22, the forefinger, on the release button 21, and the middle finger, on the operation button 21. Alternately, by holding the camera body 1 with the right hand so as to be sandwiched between the thumb and the forefinger of the right hand in the direction of width of the camera body 1 with the right hand lightly supporting the camera body 1, it is possible to operate the operation button 22 and the operation button 21 with the thumb and the middle finger of the right hand, respectively, while operating the release button 7 with the forefinger of the left hand.

In the button disposition of FIGS. 5 and 6, since the user's hands do not intervene between the back surface of the camera and the user's face, the user's face can be close to the back surface of the camera. Moreover, since it never happens that the user's hand inadvertently obstructs optical members disposed on the front surface of the camera body such as the lens 3, the autofocus unit 5 and the flash 6, shooting errors are reduced. Since optical members occupying comparatively large areas such as the lens 3, the finder 4 and the flash 6 are not provided on the surfaces opposing in directions perpendicular to the optical axis of the camera (that is, the side surfaces and the top and bottom surfaces), the operation buttons 21 and 22 can be increased in size and the degree of freedom of disposition of the operation buttons 21 and 22 increases. Other methods of operating the digital camera according to the second embodiment are not described because they are substantially the same as those of the first embodiment.

Next, a portable telephone according to a third embodiment will be described with reference to FIGS. 7A, 7B and 7C.

FIGS. 7A, 7B and 7C are a front view, a right side view and a left side view of the portable telephone according to the third embodiment.

The portable telephone 50 has a comparatively thin body case 51 having a substantially rectangular hexahedral box shape. On its front surface 51a, the following are disposed from the above: a speaker 53, a liquid crystal display section 54 for displaying various pieces of information, an operation section 55 and a microphone 56. On the top surface of the portable telephone 50, an antenna 52 is provided. The operation section 55 has operation keys 55a disposed in a matrix for performing operations such as turning on and off of the power and number input.

On the right side surface 51e and the left side surface 51f of the body case 51 of the portable telephone 50, a pair of operation buttons 57b and 57c are provided. Since no operation buttons are provided except the operation buttons 57b and 57c on these surfaces, the space where operation buttons can be disposed is larger than in a case where the operation buttons 57b and 57c are disposed on the front surface 51a where a multiplicity of operation keys 55a is disposed. Consequently, the areas occupied by the pair of operation buttons 57b and 57c can be increased, so that the operability of the buttons improves. The pair of operation buttons 57b and 57c are used as setting means for setting mutually contradictory functions, and are used, for example, for scrolling objects displayed on the liquid crystal display section 54 in the forward or the reverse direction when a stored telephone number is selected, when characters such as hiragana, katakana and kanji are input or when a predetermined function is selected from among various modes. The operation buttons 57b and 57c can also be used for turning up or down the volume of the speaker 53 or the microphone 56.

The user uses the portable telephone 50, for example, while holding it in the palm of his or her hand with its front surface facing the user's face. When the portable telephone 50 is held with the left hand, the operation keys 55a are operated with fingers of the right hand, and the operation buttons 57b and 57c are operated, for example, with the forefinger and the thumb of the left hand, respectively. When one of the operation buttons is depressed, the contents displayed on the liquid crystal display section 54 are scrolled in the forward direction or in the reverse direction, and when the other operation button is depressed, the contents are scrolled in the opposite direction. Thus, by disposing the pair of operation buttons 57b and 57c in this way, the buttons can be quickly operated without any errors compared to a case where the operation keys 55a disposed with small distances thereamong are operated one by one. The holding of the portable telephone 50 and the operation of the operation buttons 57b and 57c can be simultaneously performed with one hand, so that another work can be performed with the other hand which is free.

The present invention is not limited to the above-described embodiments, but may be carried out in various other forms unless a pair of operation buttons for setting mutually contradictory functions are disposed on the same surface. For example, the pair of operation buttons 57b and 57c of the portable telephone 50 may be disposed in positions different from those shown in FIG. 7. That is, the operation buttons 57b and 57c may be disposed on adjoining surfaces such as the top surface 51g and the left side surface 51f, and the back surface 51b and the left side surface 51f as well as on the opposing surfaces such as the top surface 51g and the bottom surface 51d, and the front surface 51a and the back surface 51b. When a member for covering the operation section 55 is provided, a pair of operation buttons may be disposed on the obverse surface and the reverse surface of the covering member.

Likewise, the pairs of operation buttons 14, 15, 21 and 22 for setting mutually contradictory functions in the digital camera may be disposed in positions different from those shown in FIGS. 1 and 2 and FIGS. 5 and 6, that is, on adjoining surfaces such as the top surface and the front surface, and the back surface and the left side surface as well as on the opposing surfaces such as the top surface and the bottom surface.

As described above, in the portable apparatus of the present invention having a pair of operation buttons for setting mutually contradictory functions, the operability of operation buttons at the time of setting has been improved.

Although preferred embodiments of the invention have been described in the foregoing detailed description and illustrated in the accompanying drawings, it will be understood that the invention is not limited to the embodiments disclosed, but is capable of numerous rearrangements, modifications and substitutions of parts and elements without departing from the spirit of the invention. Accordingly, the present invention is intended to encompass such rearrangements, modification and substitutions of parts and elements as fall within the spirit and scope of the invention.

What is claimed is:

1. A portable apparatus comprising:

a body having a first surface and a second surface opposing to the first surface;

a first button settable a first function and disposed on the first surface; and a second button settable a second function and disposed on the second surface, wherein the first function is mutually contradictory to the second function.

2. An apparatus according to claim 1, wherein the first button and the second button are disposed in positions corresponding to the thumb and the forefinger or the middle finger when the portable apparatus is held.

3. An apparatus according to claim 1, further comprising:

a zoom unit driven to the telephoto side or the wide-angle side by the operation of the first button or the second button.

4. An apparatus according to claim 1, further comprising:

an exposure correction unit to correct the exposure amount by the operation of the first button or the second button.

5. An apparatus according to claim 1, further comprising:

a display which displays images recorded in a recording section, wherein the frame number of a displaying image is increased or decreased by the operation of the first button or the second button.

6. An apparatus according to claim 1, further comprising:

a lens unit disposed on the first surface, wherein the lens unit is used to take an object image.

7. An apparatus according to claim 1, further comprising:

a lens unit shooting an object image; wherein the optical axis of the lens unit is in a perpendicular direction of the direction opposing the first surface and the second surface.

8. An apparatus according to claim 1, further comprising:

a switch capable of reversing the functions of the first button and the second button.

9. A portable apparatus comprising:

a body having a plural surface;

a pair of operation buttons disposed on different surfaces of the body respectively, wherein the pair of operation buttons is able to set mutually contradictory functions.

* * * * *